US010385911B2

(12) United States Patent
Ishihara et al.

(10) Patent No.: US 10,385,911 B2
(45) Date of Patent: *Aug. 20, 2019

(54) CRANKSHAFT FOR RECIPROCATING ENGINE, AND DESIGN METHOD THEREOF

(71) Applicant: NIPPON STEEL & SUMITOMO METAL CORPORATION, Tokyo (JP)

(72) Inventors: Koichiro Ishihara, Kyoto (JP); Ken Yoshino, Guangdong (CN)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/325,114

(22) PCT Filed: Jul. 14, 2015

(86) PCT No.: PCT/JP2015/003541
§ 371 (c)(1),
(2) Date: Jan. 10, 2017

(87) PCT Pub. No.: WO2016/009641
PCT Pub. Date: Jan. 21, 2016

(65) Prior Publication Data
US 2017/0184146 A1 Jun. 29, 2017

(30) Foreign Application Priority Data
Jul. 16, 2014 (JP) ................. 2014-146249

(51) Int. Cl.
F16C 3/08 (2006.01)
F16F 15/28 (2006.01)
(52) U.S. Cl.
CPC ............ F16C 3/08 (2013.01); F16C 2360/22 (2013.01); F16F 15/283 (2013.01)

(58) Field of Classification Search
CPC ................. F16C 3/06; F16C 3/08; F16C 3/20
See application file for complete search history.

(56) References Cited

U.S. PATENT DOCUMENTS

| 2010/0043739 A1* | 2/2010 | Jang ................... F16C 3/20 |
| | | 123/192.2 |
| 2015/0184690 A1* | 7/2015 | Kamiya .............. F16C 3/08 |
| | | 74/596 |

FOREIGN PATENT DOCUMENTS

| DE | 2160586 | 6/1973 |
| JP | 10-169637 | 6/1998 |
| JP | 4998233 | 8/2012 |

OTHER PUBLICATIONS

Machine Translation of DE 2160586, obtained Mar. 30, 2018.*

* cited by examiner

Primary Examiner — Richard W Ridley
Assistant Examiner — Brian J McGovern
(74) Attorney, Agent, or Firm — Clark & Brody

(57) ABSTRACT

When each of the crank arms is divided by the crank arm centerline-into a right arm portion and a left arm portion, an area moment of inertia of one of the right and the left arm portions that is in a side that is subjected to the maximum load is greater than an area moment of inertia of the other arm portion that is in a side opposite to the side that is subjected to the maximum load, and, the area moment of inertia of the arm portion that is in the side opposite to the side that is subjected to the maximum load is greater than the area moment of inertia of the arm portion that is in the side that is subjected to the maximum load.

2 Claims, 18 Drawing Sheets (a)

FIG. 19(a)
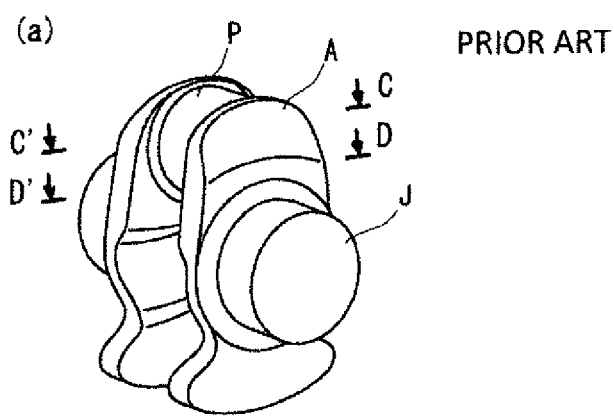
PRIOR ART
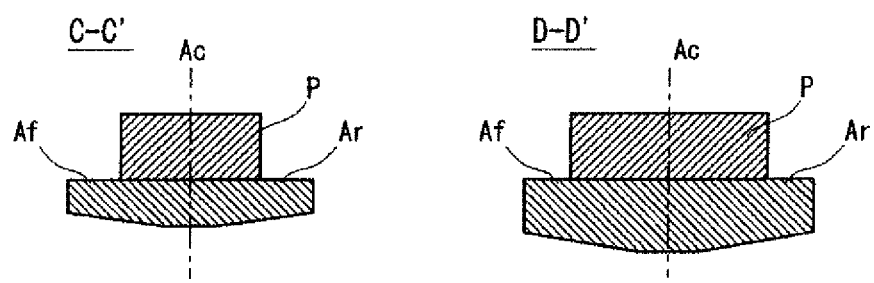
FIG. 19(b)
FIG. 19(c)
PRIOR ART
PRIOR ART

CRANKSHAFT FOR RECIPROCATING ENGINE, AND DESIGN METHOD THEREOF

TECHNICAL FIELD

The present invention relates to crankshafts to be mounted in reciprocating engines such as automotive engines, marine engines, and multiple purpose engines used in, for example, power generators and a design method of these crankshafts.

BACKGROUND ART

A reciprocating engine requires a crankshaft for converting the reciprocating motion of pistons in cylinders to rotational motion so as to extract power. Crankshafts are generally categorized into two classes: the type manufactured by die forging and the type manufactured by casting. Especially for multiple cylinder engines, the firstly mentioned die forged crankshafts, which are excellent in strength and stiffness, are often employed.

FIG. 1 is a schematic side view of an example of a common crankshaft for a multiple cylinder engine. A crankshaft 1 shown in FIG. 1 is designed to be mounted in a 4-cylinder engine and includes: five journals J1 to J5; four crank pins P1 to P4; a front part Fr, a flange F1, and eight crank arms A1 to A8 (hereinafter also referred to simply as "arms") that connect the journals J1 to J5 and the crank pins P1 to P4 to each other. The crankshaft 1 is configured such that all of the eight crank arms A1 to A8 are formed integrally with counterweights W1 to W8 (hereinafter also referred to as "weights"), respectively, and is referred to as a 4-cylinder 8-counterweight crankshaft.

Hereinafter, when the journals J1 to J5, the crank pins P1 to P4, the crank arms A1 to A8, and the counterweights W1 to W8 are each collectively referred to, the reference character "J" is used for the journals, "P" for the crank pins, "A" for the crank arms, and "W" for the counterweights. A crank pin P and a pair of crank arms A (including the counterweights W) which connect with the crank pin P are also collectively referred to as a "throw".

The journals J, the front part Fr, and the flange F1 are arranged coaxially with the center of rotation of the crankshaft 1. The crank pins P are arranged at positions eccentric with respect to the center of rotation of the crankshaft 1 by half the distance of the piston stroke. The journals J are supported by the engine block by means of sliding bearings and serve as the central rotation axis. The big end of a connecting rod (hereinafter referred to as "conrod") is coupled to the crank pin P by means of a sliding bearing, and a piston is coupled to the small end of the conrod by means of a piston pin. The front part Fr is a front end portion of the crankshaft 1. To the front part Fr, a damper pulley 2 to drive a timing belt, a fan belt or the like is fitted. The flange F1 is a rear end portion of the crankshaft 1. To the flange F1, a flywheel 3 is fitted.

In an engine, fuel explodes within cylinders. The combustion pressure generated by the explosion causes reciprocating motion of the pistons, which is converted into rotational motion of the crankshaft 1. In this regard, the combustion pressure acts on the crank pins P of the crankshaft 1 via the conrod and is transmitted to the journals J via the respective crank arms A connecting to the crank pins P. In this process, the crankshaft 1 rotates while repetitively undergoing elastic deformation.

The bearings that support the journals of the crankshaft are supplied with lubricating oil. In response to the elastic deformation of the crankshaft, the oil film pressure and the oil film thickness in the bearings vary in correlation with the bearing load and the journal center orbit. Furthermore, depending on the surface roughness of the journals and the surface roughness of the bearing metal in the bearings, not only the oil film pressure but also local metal-to-metal contact occurs. Ensuring a sufficient oil film thickness is important in order to prevent seizure of the bearings due to lack of lubrication and to prevent local metal-to-metal contact, thus affecting the fuel economy performance.

In addition, the elastic deformation accompanied with the rotation of the crankshaft and the movements of the center orbit of the journals within the clearances of the bearings cause an offset of the center of rotation, and therefore affect the engine vibration (mount vibration). Furthermore, the vibration propagates through the vehicle body and thus affects the noise in the vehicle and the ride quality.

In order to improve such engine performance properties, there is a need for a crankshaft that is lightweight and is high in stiffness with the ability to resist deformation.

FIG. 2 is a graph indicating a curve showing the pressure in a cylinder of a four-cycle engine. In FIG. 2, when the position of the crankshaft where the crank pin comes to a top dead point in a compression process is considered as a reference (point of crank angel $\theta$ of 0 degrees), an explosion occurs immediately after the top dead point in the compression process. Accordingly, the pressure in the cylinder becomes a maximum combustion pressure when the crank angle $\theta$ becomes about 8 to 20 degrees. The crankshaft is subjected to the load of pressure in the cylinder (combustion pressure) as shown in FIG. 2, and also subjected to the load of centrifugal force of rotation. The design of the crankshaft aims to improve the flexural rigidity and the torsional rigidity, thereby achieving deformation resistance against these loads, along with weight reduction.

In designing a crankshaft, generally, the main specifications such as the journal diameter, the crank pin diameter, and the piston stroke are firstly determined. The point that can undergo design changes to ensure sufficient flexural rigidity and torsional rigidity after determination of the main specifications is only the shape of the crank arms. Thus, the design of the crank arm shape is an important factor affecting the performance of the crankshaft. Strictly speaking, as described above, the crank arms mean the oval portions connecting the journals and the crank pins to each other and do not include the portions serving as counterweights.

Japanese Patent No. 4998233 (Patent Literature 1) discloses a technique of making recess grooves in the crank pin-side surface and the journal-side surface of each crank arm, in the center, aiming at an increase in flexural rigidity, an increase in torsional rigidity and also a reduction in weight of the crankshaft. The technique disclosed in Patent Literature 1 provides a design method of a crank arm, focusing on a reduction in weight and an increase in stiffness of each crank arm in the state where the crank angle $\theta$ is 0 degrees (that is, in the state where the crank pin is in the top dead point in the compression process). In other words, the design method shows how to reduce the weight of the crank arm while achieving a given target value of stiffness in the state where the crank angle $\theta$ is 0 degrees. Also, the design method shows how to increase the stiffness of the crank arm while achieving a given target value of weight reduction.

Japanese Patent Application Publication No. 10-169637 (Patent Literature 2) discloses a method for calculating an optimal distribution of mass moments of the counterweights by using the three-moment equation in the Strength of Materials. The technique disclosed in Patent Literature 2 provides a method including approximating a crankshaft to stepped round-bar beams and adjusting the distribution of mass moments of the counterweights in accordance with the stiffness of the crank arms and the mass moments of the crank arms to minimize the loads on the journals. In other words, according to the method, the stiffness of each crank arm is determined by taking a prepared value or in another way, and thereafter, the distribution of mass moments of a plurality of counterweights (for example, eight counterweights in a case of a 4-cylinder and 8-counterweight crankshaft) is adjusted so that the loads on the bearings of the journals can be minimized.

CITATION LIST

Patent Literature

Patent Literature 1: Japanese Patent No. 4998233
Patent Literature 2: Japanese Patent Application Publication No. 10-169637

SUMMARY OF INVENTION

Technical Problem

As shown in FIG. 2, the pressure in the cylinder becomes a maximum combustion pressure not when the crank angle θ is 0 degrees but when the crank angle θ is about 8 to 20 degrees. Accordingly, the crank pin is loaded with the maximum combustion pressure via the conrod when the crank angle θ is about 8 to 20 degrees. In this moment, the load direction of the combustion pressure onto the crank pin is a direction from the axis of the piston pin (the axis of the small end of the conrod) to the axis of the crank pin. Accordingly, the maximum combustion pressure is applied to the crank arm not in the direction along a line connecting the axis of the crank pin to the axis of the journal (hereinafter referred to as "crank arm centerline") but in a direction inclined from the crank arm centerline.

The crank arm design method disclosed in Patent Literature 1 is based on the premise that a maximum load due to a maximum combustion pressure is applied to the crank arm in the state where the crank arm θ is 0 degrees. In other words, this method is based on the premise that the maximum load is applied in the direction along the crank arm centerline. Then, the crank arm shape obtained by the technique disclosed in Patent Literature 1 does not fit for reality. Therefore, the crank arm shape is not necessarily appropriate for an improvement in stiffness and a reduction in weight. In the first place, the technique disclosed in Patent Literature 2 is not intended to improve the stiffness of a crank arm.

The present invention has been made in view of the above circumstances. An object of the present invention is to provide a crankshaft for reciprocating engines which has an increased flexural rigidity fit for reality and a reduced weight, and a design method of the crankshaft.

Solution to Problem

The present invention is to solve the above-described problems, and the gist of the present invention is a crankshaft for reciprocating engines as described in the following section (I) and a crankshaft design method as described in the following section (II).

(I) A crankshaft of the present embodiment includes: journals that define a central axis of rotation; crank pins that are eccentric with respect to the journals; crank arms connecting the journals to the crank pins; and counterweights integrated with the crank arms, wherein when the crankshaft is mounted in the reciprocating engine, a load due to combustion pressure is applied to each of the crank pins via a connecting rod in a direction from an axis of a piston pin to an axis of the crank pin.

Each of the crank arms has an asymmetric shape with respect to a crank arm centerline connecting the axis of each of the crank pins to an axis of each of the journals, and Each of the crank arms has a maximum flexural rigidity at a point of time when the load onto each of the crank pins due to the combustion pressure reaches a maximum.

When each of the crank arms is divided by the crank arm centerline into a right arm portion and a left arm portion, in each section of each of the crank arms on a plane perpendicular to the crank arm centerline at a position outward of the axis of the crank pin, an area moment of inertia of one of the right and the left arm portions that is in a side that is subjected to the maximum load is greater than an area moment of inertia of the other arm portion that is in a side opposite to the side that is subjected to the maximum load, and in each section of each of the crank arms on a plane perpendicular to the crank arm centerline at a position inward of the axis of the crank pin, the area moment of inertia of the arm portion that is in the side opposite to the side that is subjected to the maximum load is greater than the area moment of inertia of the arm portion that is in the side that is subjected to the maximum load.

The crankshaft may be configured such that in each section of each of the crank arms on a plane perpendicular to the crank arm centerline at a position outward of the axis of the crank pin, a maximum thickness of the arm portion that is in the side that is subjected to the maximum load is greater than a maximum thickness of the arm portion that is in the side opposite to the side that is subjected to the maximum load, and in each section of each of the crank arms on a plane perpendicular to the crank arm centerline at a position inward of the axis of the crank pin, the maximum thickness of the arm portion that is in the side opposite to the side that is subjected to the maximum load is greater than the maximum thickness of the arm portion that is in the side that is subjected to the maximum load.

Also, the crankshaft may be configured such that in each section of each of the crank arms on a plane perpendicular to the crank arm centerline at a position outward of the axis of the crank pin, a width of the arm portion that is in the side that is subjected to the maximum load is greater than a width of the arm portion that is in the side opposite to the side that is subjected to the maximum load, and in each section of each of the crank arms on a plane perpendicular to the crank arm centerline at a position inward of the axis of the crank pin, the width of the arm portion that is in the side opposite to the side that is subjected to the maximum load is greater than the width of the arm portion that is in the side that is subjected to the maximum load.

(II) A crankshaft design method of the present embodiment is a method for designing the crankshaft described in the section (I), and the design method includes designing the shape of each of the crank arms to be asymmetric with respect to the crank arm centerline such that at the point of time when the maximum load due to the combustion pressure is applied, the crank arm has a maximum flexural rigidity in a direction from which the maximum load is applied, thereby meeting a target rigidity, and such that the crank arm meets a target weight.

The crankshaft design method may include designing the shape of each of the crank arm to allow for minimization of weight of the crank arm under a condition that the flexural rigidity of the crank arm in the direction from which the maximum load due to the combustion pressure is applied is fixed.

Advantageous Effects of Invention

In the crankshaft according to the present invention, the crank arm has a shape that is asymmetric with respect to the crank arm centerline, reflecting reality. Therefore, the flexural rigidity of the crank arm is increased with high reliability, and at the same time, a reduction in weight of the crank arm can be achieved.

BRIEF DESCRIPTION OF DRAWINGS

FIGS. 4(a) and 4(b) are schematic diagrams illustrating a method for evaluating the torsional rigidity of a crank arm, wherein FIG. 4(a) is a side view of a throw, and FIG. 4(b) is a front view thereof in the axial direction.

FIGS. 12(a) and 12(b) are diagrams showing examples of beam shapes according to the beam theory in the Strength of Materials, wherein FIG. 12(a) shows a rectangular cross-sectional beam, and FIG. 12(b) shows a beam with a reduced weight.

FIGS. 19(a) to 19(c) are diagrams showing an example of the shape of a crank arm of a conventional crankshaft.

DESCRIPTION OF EMBODIMENTS

Embodiments of the crankshaft for reciprocating engines according to the present invention, and a design method thereof will hereinafter be described.

Figure 1:
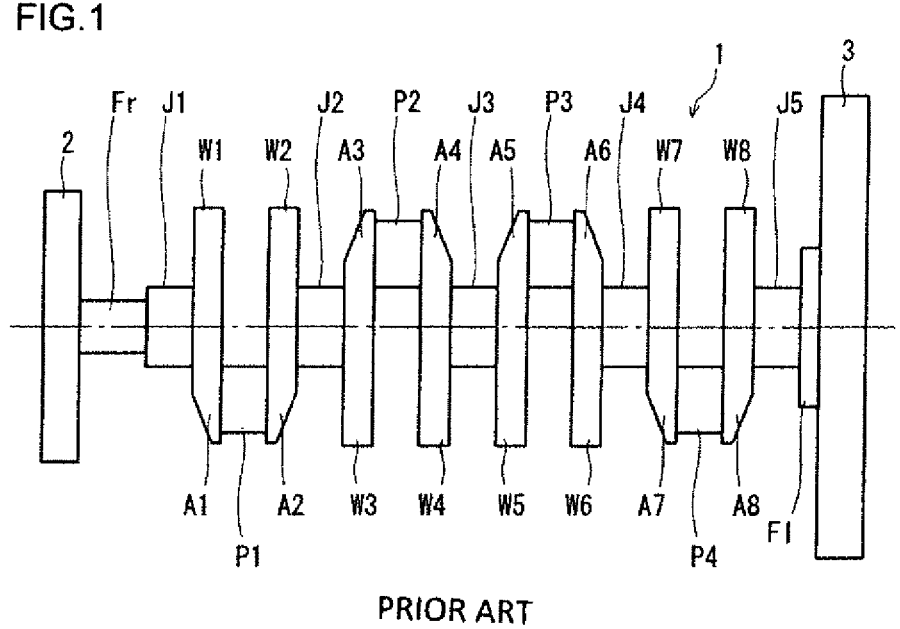
FIG. 1 is a schematic side view of an example of a common crankshaft for a multiple cylinder engine.
Figure 2:
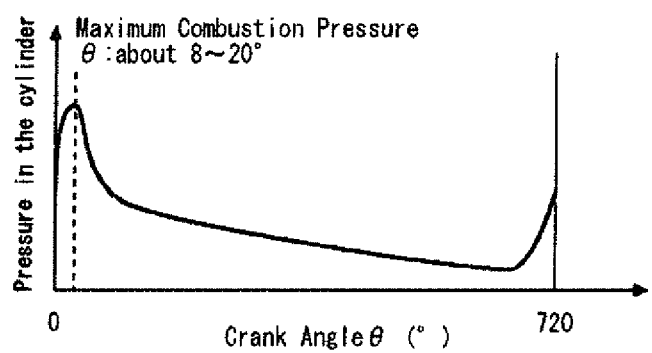
FIG. 2 is a graph indicating a curve showing the pressure in a cylinder of a four-cycle engine.
Figure 3:
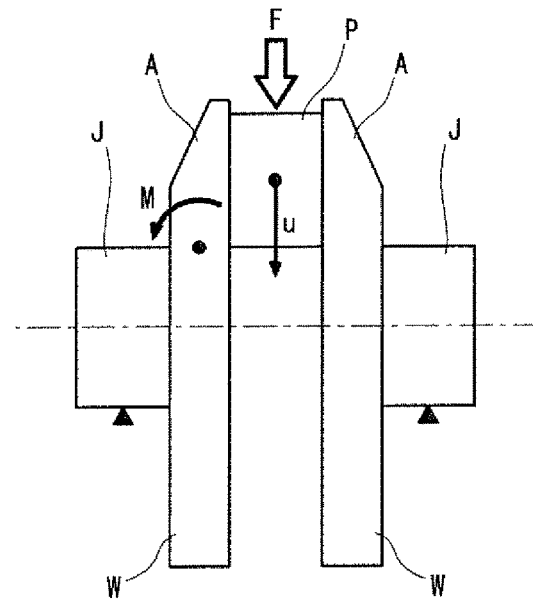
FIG. 3 is a schematic diagram illustrating a method for evaluating the flexural rigidity of a crank arm.

1. Basic Techniques to Consider in Designing Crankshaft
1-1. Flexural Rigidity of Crank Arm FIG. 3 is a schematic diagram illustrating a method for evaluating the flexural rigidity of a crank arm. As shown in FIG. 3, in each throw of the crankshaft, a load F of combustion pressure generated by the ignition and explosion in the cylinder is applied to the crank pin P via a conrod. Since the journals J at the both ends of each throw are supported by bearings, the load F is transmitted to the journal bearings from the crank pin P via the crank arms A. Thus, each of the crank arms A is put into a state of being subjected to a load of three-point bending, and a bending moment M acts on the crank arm A. Accordingly, in each crank arm A, compressive stress occurs at the outside in the thickness direction (the side adjacent to the journal J), and tensile stress occurs at the inside in the thickness direction (the side adjacent to the crank pin P). In this moment, the flexural rigidity Mc of the crank arms A counteracts the stresses. The flexural rigidity Mc, and the flexural rigidity Mt of the whole one throw including the flexural rigidity of the crank pin and the flexural rigidity of the journals can be evaluated as shown by the following formula (1).

$$Mt = F/u \quad (1)$$

wherein, F represents a load of combustion pressure applied to the crank pin, and u represents a displacement of the crank pin center with respect to the axial direction in the load direction of combustion pressure.

1-2. Torsional Rigidity of Crank Arm

Figure 4:
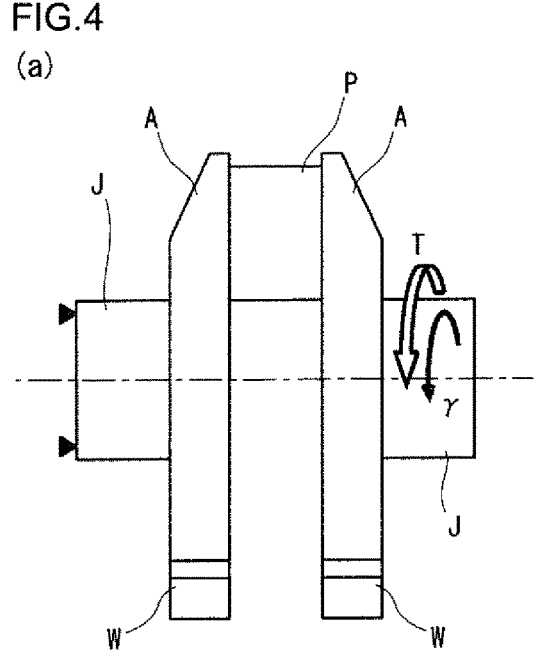
Figure 4:
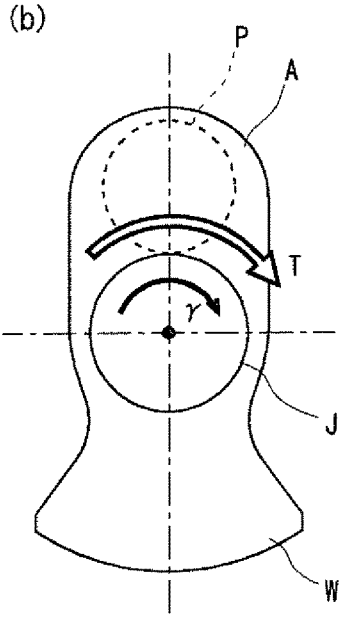

FIGS. 4(a) and 4(b) are schematic diagrams illustrating a method for evaluating the torsional rigidity of a crank arm, wherein FIG. 4(a) is a side view of a throw, and FIG. 4(b) is a front view thereof in the axial direction. The crankshaft rotates about the journal J, which causes a torsional torque T as shown in FIGS. 4(a) and 4(b). Thus, it is necessary to enhance the torsional rigidity of the crank arms A in order to ensure smooth rotation against the torsional vibrations of the crankshaft without causing resonance. The torsional rigidity of each throw greatly depends on the torsional rigidity of the crank arms A in a case where the diameters of the crank pin P and the journals J have been determined. The torsional rigidity Tc of the crank arms A, and the torsional rigidity Tt of the whole one throw including the torsional rigidity of the crank pin and the torsional rigidity of the journals are given by the following formula (2).

$$Tt = T/\gamma \qquad (2)$$

wherein, T represents a torsional torque, and γ represents a torsion angle.

For these reasons, it is necessary to design a crankshaft to increase both the flexural rigidity and the torsional rigidity of the crank arms. It is to be noted that the counterweights W seldom contribute to the flexural rigidity and the torsional rigidity. Accordingly, the increases in flexural rigidity and in torsional rigidity dominantly depend on the shape of the crank arms A and do not depend on the shape of the counterweights W. The counterweights W mainly serve to balance the mass by adjusting the position of the center of mass and the mass.

2. Crankshaft of Present Embodiment and Design Method Thereof 2-1. Outline

Figures 5A, 5B:
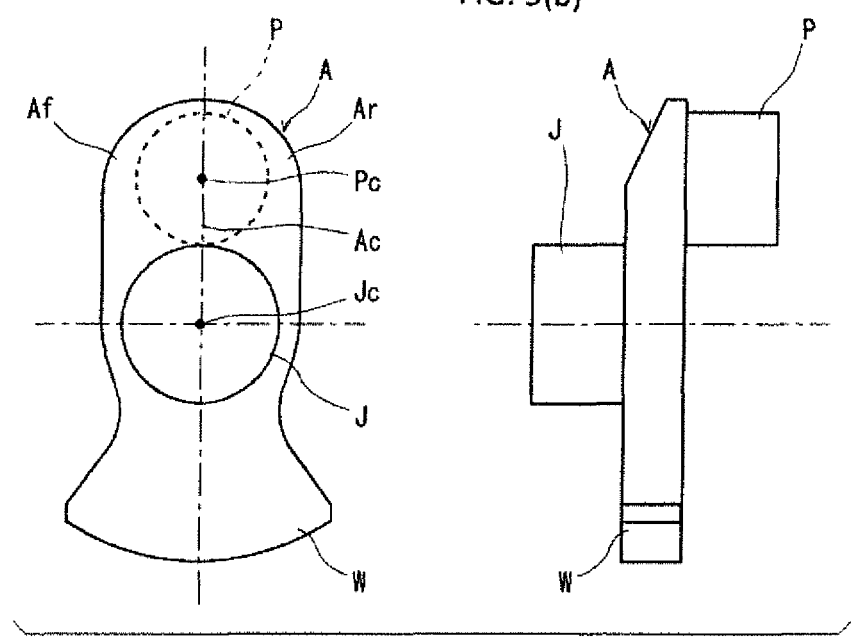
FIGS. 5(a) and 5(b) are schematic diagrams showing the shape of a crank arm of a conventional crankshaft.

FIGS. 5(a) and 5(b) are schematic diagrams showing the shape of a crank arm of a conventional crankshaft. FIG. 5(a) is a front view of the crank arm in the axial direction, and FIG. 5(b) is a side view thereof. As shown in FIGS. 5(a) and 5(b), the crank arm A of the conventional crankshaft has a shape laterally symmetric with respect to the crank arm centerline Ac connecting the axis Pc of the crank pin P to the axis Jc of the Journal J. In other words, the crank arm A includes a right arm portion Ar and a left arm portion Af that are symmetric with respect to the crank arm centerline Ac. This is because the shape of a crank arm A has been conventionally designed in the premise that the maximum load on the crank arm A due to the maximum combustion pressure is applied in the direction along the crank arm centerline Ac.

On the other hand, each crank arm of the crankshaft of the present embodiment has the following features.

Figure 6:
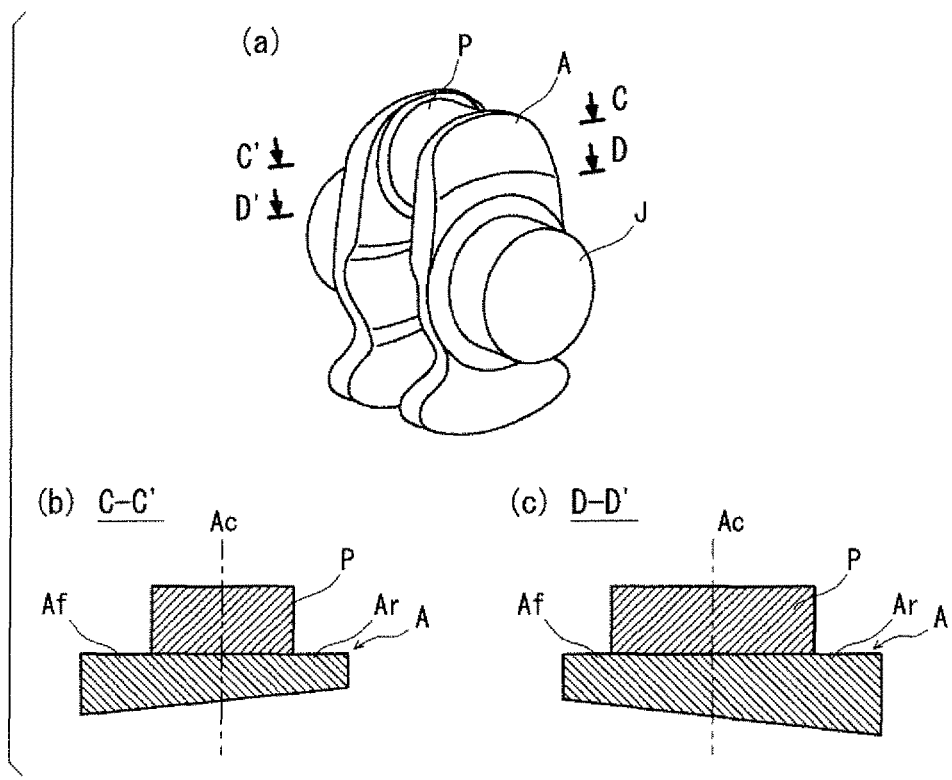
FIGS. 6 (a) to 6(c) are schematic diagrams showing an example of the shape of a crank arm of a crankshaft of the present embodiment.

FIGS. 6(a) to 6(c) are schematic diagrams showing an example of the shape of the crank arm of the crankshaft of the present embodiment. FIG. 6(a) is a perspective view of a throw, FIG. 6(b) is a sectional view thereof on a plane perpendicular to the crank arm centerline at a position C-C' as indicated in FIG. 6(a), and FIG. 6(c) is a sectional view thereof on a plane perpendicular to the crank arm centerline at a position D-D' different from the position C-C' as indicated in FIG. 6(a). The position C-C' shown by FIG. 6(b) is a position that is outward of the axis of the crank pin. The position D-D' shown by FIG. 6(c) is a position that is inward of the axis of the crank pin. As is clear from FIGS. 6(a) and 6(b), the crank arm A of the crankshaft of the present embodiment has an asymmetric shape with respect to the crank arm centerline Ac. In other words, the right arm portion Ar and the left arm portion Af of the crank arm A are asymmetric with respect to the crank arm centerline Ac.

Thus, according to the present embodiment, the shape of the crank arm A is designed in the premise, reflecting reality, that the maximum load due to the maximum combustion pressure is applied to the crank arm A in the state where the crank angle θ is about 8 to 20 degrees. In short, the crank arm shape is designed in the premise that the maximum load is applied in a direction inclined at an angle α from the crank arm centerline Ac. The shape of the crank arm A is designed by varying the right arm portion Ar and the left arm portion Af independently of each other such that the crank arm A has a maximum flexural rigidity in the direction in which the maximum load is applied, thereby meeting the target rigidity. It is also necessary to design the shape of the crank arm A such that the crank arm A meets the target weight.

In the following paragraphs, the angle of the direction in which the combustion pressure is applied to the crank arm A (the direction from the axis of the piston pin to the axis of the crank pin) to the crank arm centerline Ac will sometimes be referred to as a load angle β. Among such load angles β, the load angle at which the maximum load due to the maximum combustion pressure is applied when the crank angle θ is about 8 to 20 degrees will sometimes be referred to as a maximum load angle α.

Figure 7:
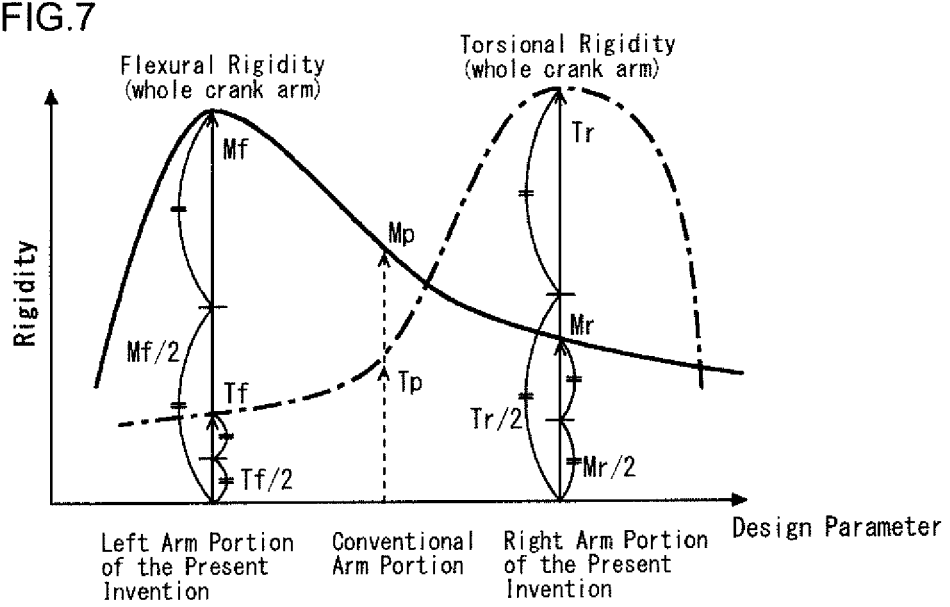
FIG. 7 is a conceptual diagram illustrating the latitude of the design parameter for stiffness of the crank arm of the crankshaft of the present embodiment.

FIG. 7 is a conceptual diagram illustrating the latitude of the design parameter for stiffness of the crank arm of the crankshaft of the present embodiment.

As shown in FIGS. 6(b) and 6(c), the right arm portion Ar of the crank arm A of the crankshaft of the present embodiment is extracted for consideration, and the left arm portion Af of the crank arm A of the crankshaft of the present embodiment is extracted for consideration. In this case, as shown in FIG. 7, the flexural rigidity Mc of the whole crank arm A is the sum of the flexural rigidity "Mr/2" of the right arm portion Ar and the flexural rigidity "Mf/2" of the left arm portion Af. Similarly, the torsional rigidity Tc of the whole crank arm A is the sum of the torsional rigidity "Tr/2" of the right arm portion Ar and the torsional rigidity "Tf/2" of the left arm portion Af.

In FIG. 7, the flexural rigidity Mp and the torsional rigidity Tp of a crank arm A of a conventional crankshaft are also indicated. Since each crank arm A of the conventional crankshaft has a laterally symmetric shape, there is only one design parameter. Accordingly, the flexural rigidity Mp and the torsional rigidity Tp correspond to the design parameter on a one-to-one basis. Once the design parameter has been selected, there is no latitude for a combination of the flexural rigidity Mp and the torsional rigidity Tp.

In the crankshaft according to the present embodiment, on the other hand, since the shape of the right arm portion Ar and the shape of the left arm portion Af of the crank arm A differ from each other, there are two design parameters. Accordingly, the flexural rigidity "Mr/2" and the torsional rigidity "Tr/2" of the right arm portion Ar, and the flexural rigidity "Mf/2" and the torsional rigidity "Tf/2" of the left arm portion Af can be selected independently of each other. The sum of these rigidities becomes the stiffness of the whole asymmetric crank arm A. This provides more parameter options for stiffness design that also allows for weight reduction of the crankshaft.

In short, while in a conventional crankshaft, the stiffness of each crank arm is represented by the flexural rigidity Mp and the torsional rigidity Tp, in the crankshaft of the present embodiment, the stiffness of each crank arm is represented by the following formulae (3) and (4). Thus, in the crankshaft of the present embodiment, the right portion and the left portion of each crank arm can be designed independently of each other, and the crankshaft of the present embodiment has the advantage of having greater latitude of design choice.

$$\text{Flexural Rigidity: } Mc = (Mr + Mf)/2 \qquad (3)$$

$$\text{Torsional Rigidity: } Tc = (Tr + Tt)/2 \qquad (4)$$

By appropriately selecting the shapes of the right portion and the left portion of the crank arm independently of each other for the purpose of reducing the weight, it is possible that the asymmetric crank arm has greater stiffness than the conventional symmetric crank arm as shown by the following expressions (5) and (6). In short, this provides the advantage of greater latitude of design choice for a reduction in weight and an increase in stiffness.

$$Mc=(Mr+Mf)/2>Mp \quad (5)$$

$$Tc=(Tr+Tf)/2>Tp \quad (6)$$

Figure 8:
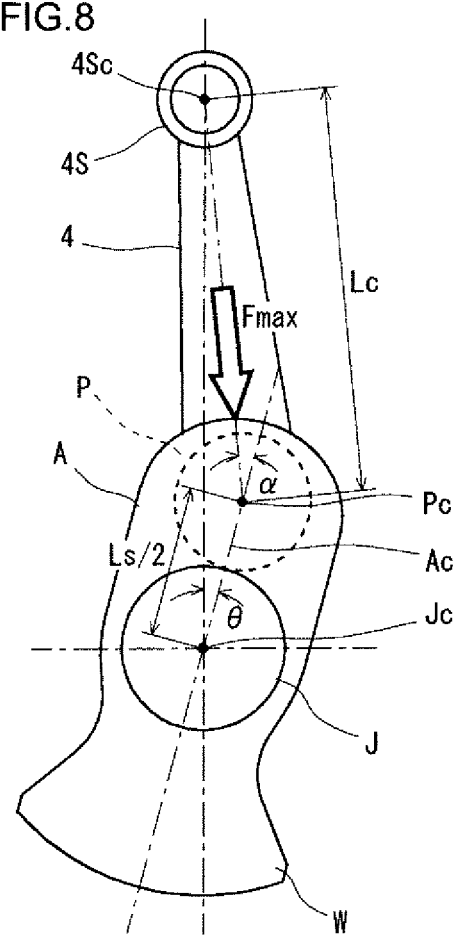
FIG. 8 is an illustration showing the geometric relationship between the crank arm and the conrod of the crankshaft at the point of time when the load of combustion pressure reaches a maximum.
Figure 9:
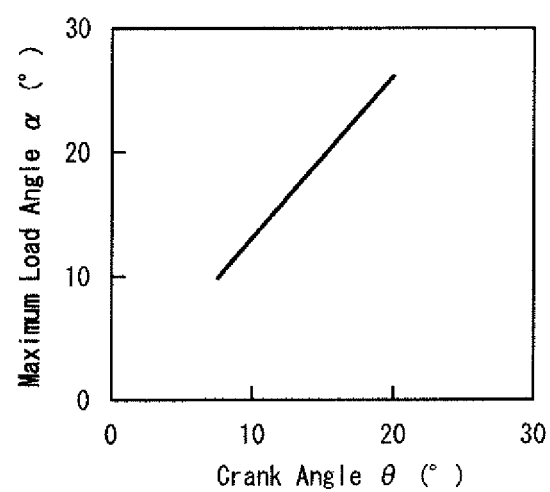
FIG. 9 is a graph showing the correlation between the crank angle θ at the point of time when the load of combustion pressure reaches a maximum and the maximum load angle α.

FIG. 8 is an illustration showing the geometric relationship between the crank arm and the conrod of the crankshaft at the point of time when the load of combustion pressure reaches a maximum. FIG. 9 is a graph showing the correlation between the crank angle θ at the point of time when the load of combustion pressure reaches a maximum and the maximum load angle α. With regard to the bending load, the time when the combustion pressure in the cylinder reaches a maximum is the point of time when the crank angle θ becomes about 8 to 20 degrees by slight rotation of the crankshaft from the top dead point in the compression process.

As shown in FIG. 8, the crank arm A is subjected to the maximum load Fmax of the maximum combustion pressure in the direction inclined at the maximum load angle α from the crank arm centerline Ac. The maximum load angle α is determined as an external angle of a triangle defined by one angle and two sides, that is, defined by the crank angle "θ" at the point of time when the load of the maximum combustion pressure is applied the distance "Ls/2", a half of the piston stroke Ls (the distance between the axis Pc of the crank pin P and the axis Jc of the journal J), and the distance "Lc" between the axis 4Sc of the small end 4S of the conrod 4 (the axis of the piston pin) and the axis Pc of the crank pin P. Accordingly, the arm A is subjected to a bending load at the maximum load angle α (about 10 to a little over 20 degrees), which is a little greater than the crank angle θ (about 8 to 20 degrees), to the crank arm centerline Ac (see FIG. 9).

Figure 10:
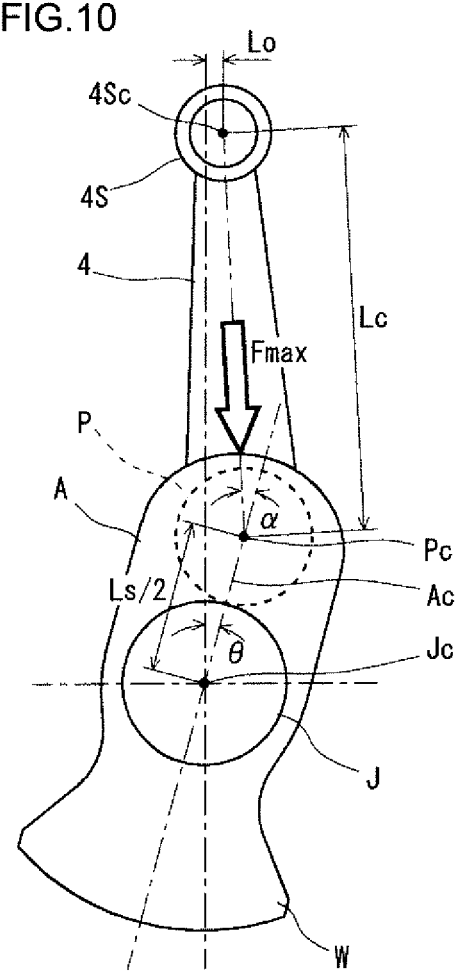
FIG. 10 is a schematic view showing another example of the geometric relationship between the crank arm and the conrod at the point of time when the load of combustion pressure reaches a maximum.

FIG. 10 shows another example of the geometric relationship between the crank arm and the conrod at the point of time when the load of combustion pressure is the maximum. In the engine shown by FIG. 10, the axis Jc of the journal J (the rotation axis of the crankshaft) is offset from the central axis of the cylinder. Alternatively, the axis Jc of the journal J is located on the central axis of the cylinder, but the axis of the piston pin is offset from the central axis of the cylinder. In such a case, the maximum load angle α is determined geometrically from a triangle defined in a similar way to the triangle defined in the case of FIG. 8 and the amount of offset Lo.

2-2. Design Outline

For design of a crank arm to increase the stiffness, actually, it is possible to use a non-parametric shape optimization software. With such a non-parametric shape optimization software, it is possible to design a crank arm of a laterally asymmetric shape having an increased flexural rigidity and an increased torsional rigidity by using, as a model, a crank arm to be subjected to a maximum bending load applied at a maximum load angle α of about 10 to a little more than 20 degrees, by setting flexural rigidity as the object function and by setting weight as the limiting condition.

Alternatively, a cut-and-try approach may be used to design the crank arm. In the cut-and-try approach, a plurality of crank arms, each having a laterally asymmetric shape, are formed as models, and each of the models undergoes an FEM analysis while being subjected to a bending load applied at the maximum load angle α and a torsional torque. Then, the best model that achieves the target stiffness is selected. In this case, it is possible to obtain a crank arm with an approximately optimized shape.

The use of a non-parametric shape optimization software provides a crankshaft with a reduced weight and an increased stiffness by a more theoretical extreme value method, and therefore, a non-parametric shape optimization software has the advantage of bringing a better result. Whatever approach is used for the design, it is essential to design the crank arm to have a laterally asymmetric shape and to have a maximum flexural rigidity against a bending load applied at the maximum load angle α.

Figure 11:
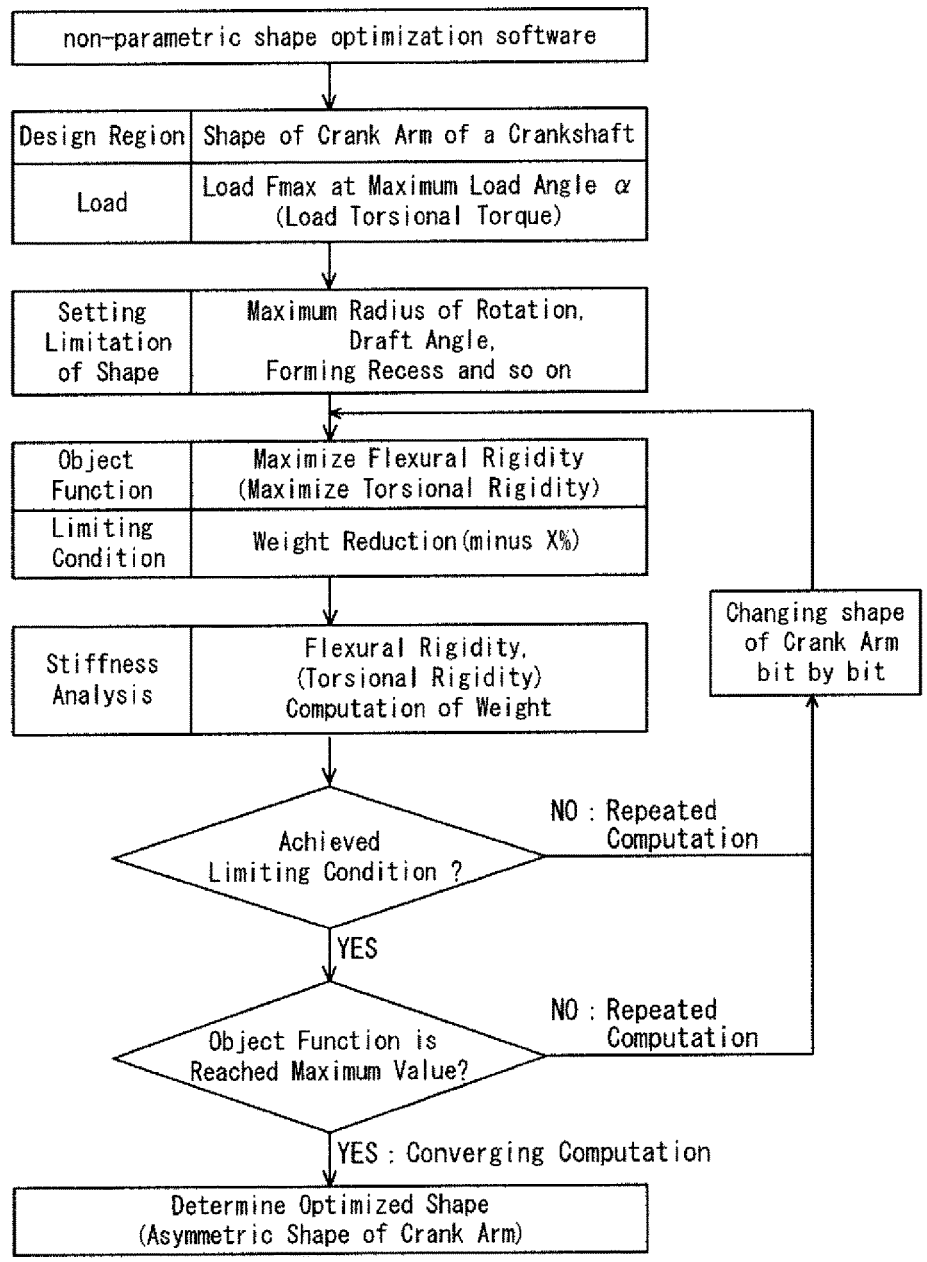
FIG. 11 is a flowchart showing an example of the outline of design of the crank arm of the crankshaft of the present embodiment.

FIG. 11 is a flowchart showing an example of the outline of design of the crank arm of the crankshaft of the present embodiment. Here, a non-parametric shape optimization software is used. First, a crank arm of a crankshaft is set as the design region, and a bending load Fmax is applied to an analysis model of a throw at a maximum load angle α. Next, a limitation is imposed on the shape of the crank arm. Specifically, allowable ranges are set on the maximum radius of rotation, the draft angle in a case of a forged crankshaft and the like, from a standpoint of design and manufacturing limitation.

In the optimization analysis, an increase in flexural rigidity is set as the object function, and an analysis is conducted to increase the flexural rigidity as much as possible with the initial analysis model used as a reference. In this regard, the limiting condition is a reduction in the weight of the crank arm, and the amount of weight reduction from the weight of the initial model is set up. When a reduction in weight is intended, the weight reduction is specified in the form of a weight reduction of minus X % relative to the initial model.

In repeated computation, the shape of the crank arm is changed bit by bit so as to reduce the weight, that is, to meet the limiting condition first. Once the limiting condition (weight reduction) is met, next, the shape of the crank arm is changed bit by bit so as to increase the flexural rigidity, which is the object function, while maintaining the limiting condition.

The flexural rigidity is increased to the maximum, and it is judged whether the flexural rigidity has reached a (local) maximum value. The local maximum value is defined as a value of flexural rigidity when the object function (flexural rigidity) no longer changes, and when the flexural rigidity becomes this state, it is judged that the computation has been converged. In this moment, the crank arm achieves the target reduced weight and also achieves the target high flexural rigidity such that the crank arm theoretically has a maximum flexural rigidity against the maximum bending load applied at the maximum load angle α. The shape of the crank arm satisfying these conditions are laterally asymmetric with respect to the crank arm centerline.

2-3. Specific Examples 2-3-1. Maximization of Flexural Rigidity as Object Function In order to design a crank arm to have a maximum flexural rigidity at the point of time when a bending load is applied at a maximum load angle α, it is a necessary condition that the crank arm has an asymmetric shape. In the following, simple specific examples based on Strength of Materials are given. However, the examples do not exclusively represent the shape of the crank arm.

(A) Fundamental Knowledge from Strength of Materials

With regard to flexural rigidity, based on the fundamental knowledge from Strength of Materials, a rectangular beam is given as an example. The relationship between the flexural rigidity and the area moment of inertia of the beam is shown by the following formulae (7) to (9). The relationship shown in the formulae indicates that increasing the area moment of inertia results in an increase in flexural rigidity.

$$\text{Flexural rigidity: } E \times I \quad (7)$$

$$\text{Area moment of inertia: } I = (1/12) \times b \times h^3 \quad (8)$$

$$\text{Flexural displacement: } v = k(M/(E \times I)) \quad (9)$$

where the cross section of the crank arm is assumed to be rectangular, b represents the width of the crank arm, h represents the thickness of the crank arm, E represents the Young's modulus, M represents the bending moment, and k represents the shape factor.

With respect to torsional rigidity, on the other hand, based on the fundamental knowledge from Strength of Materials, a round bar is given as a simple example. The relationship between the torsional rigidity and the polar area moment of inertia of the beam is shown by the following formulae (10) to (12). The relationship shown in the formulae indicates that increasing the polar area moment of inertia of the beam by forming the beam to have a circular cross sectional shape results in an increase in torsional rigidity, which is desired. In this regard, placing materials (mass) far from the axis of torsion provides an increase in polar area of moment of inertia. Accordingly, a preferred way to increase the torsional rigidity and at the same time to reduce the weight is to arrange a large amount of mass in a circle with a large radius of which center point lies on the axis of torsion or alternatively to arrange the mass in a circle. Here, the direction of the design guideline is given.

$$\text{Torsional rigidity: } T/\gamma \quad (10)$$

$$\text{Polar area moment of inertia: } J = (\pi/32) \times d^4 \quad (11)$$

$$\text{Torsion angle: } \gamma = T \times L/(G \times J) \quad (12)$$

where L represents the axial length, G represents the modulus of rigidity, d represents the radius of the round bar, and T represents the torsional torque.

Generally, crank arms of a crankshaft are required to have a high flexural rigidity. Also, practically, crank arms are required to have a high torsional rigidity. Therefore, it is preferred to increase the flexural rigidity of the crank arms and concurrently increase the torsional rigidity of the crank arms. However, the increase in torsional rigidity is an additional improvement, and in the following, the torsional rigidity will not particularly be discussed.

(B) Description of Laterally Asymmetric Crank Arm Shape Allowing for Weight Lightness and High Stiffness Against Bending As described above, the maximum bending load is applied to the crank arm in the direction inclined at the maximum load angle α from the crank arm centerline. From this viewpoint, it is an effective way to modify a beam-like crank arm having a reduced weight and high stiffness into a laterally asymmetric shape. The reason will be described in the following.

Figure 12:
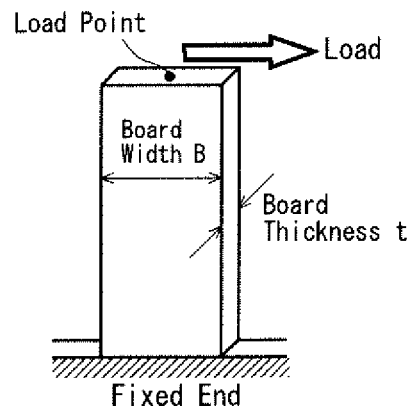
Figure 12:
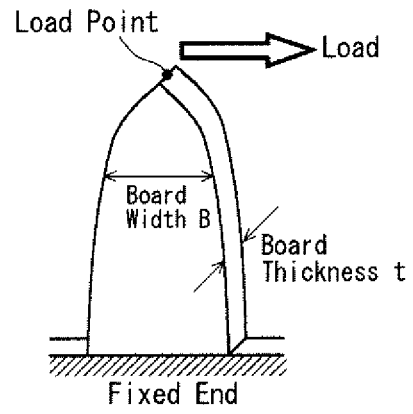

FIGS. 12(a) and 12(b) show examples of beam shapes according to the beam theory in Strength of Materials. FIG. 12(a) shows a rectangular beam, and FIG. 12(b) shows a beam that is reduced in weight. A crank arm will hereinafter be considered simply in terms of Strength of Materials, based on the beam theory. In consideration of receiving a bending load, the two-dimensional shape of the most lightweight beam (having a constant board thickness t) that is high in stiffness and low in deformability is not a rectangular beam having a constant board width B as shown in FIG. 12(a) but a lightweight beam of which board width B simply increases from the load point to the fixed end as shown in FIG. 12(b).

Figure 13:
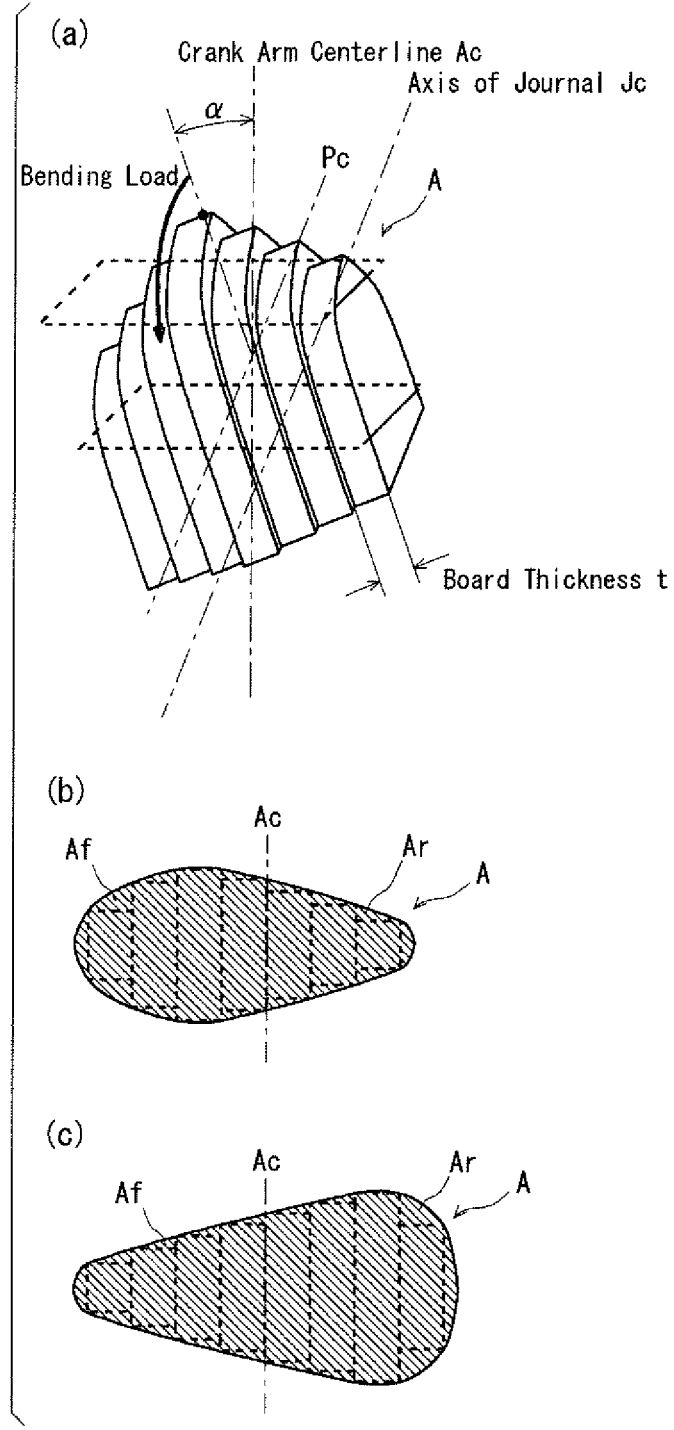
FIGS. 13(a) to 13(c) are diagrams showing a crank arm having a laterally asymmetric shape in accordance with the concept of a lightweight beam shown by FIG. 12(b).

FIGS. 13(a) to 13(c) show a crank arm having a laterally asymmetric shape in accordance with the concept for weight reduction of a beam shown by FIG. 12(b). FIG. 13(a) is a perspective view, and FIGS. 13(b) and 13(c) are sectional views on planes perpendicular to the crank arm centerline. FIG. 13(b) is a sectional view at a position outward of the axis of the crank pin, that is, a sectional view at a position shifted from the axis of the crank pin in the direction away from the journal. FIG. 13(c) is a sectional view at a position inward of the axis of the crank pin, that is, a sectional view at a position shifted from the axis of the crank pin in the direction toward the journal. A crank arm A as shown by FIG. 8 or 10 which is subjected to the maximum bending load applied from the direction inclined at the maximum load angle α from the crank arm centerline is considered to be a crank arm as shown by FIG. 13(a) that is a laminate of a plurality of beams with a board thickness of t. By configuring each of the plurality of beams to be a lightweight beam as shown by FIG. 12(b) of which board thickness B simply increases toward the fixed end, a crank arm A that is the most lightweight and high in stiffness can be obtained.

When the crank arm A is cut along planes perpendicular to the crank arm centerline Ac as shown in FIG. 13(a), geometrically, the sections are laterally asymmetric shapes with respect to the crank arm centerline Ac as shown by FIGS. 13(b) and 13(c). Specifically, the crank arm A is divided into a right arm portion Ar and a left arm portion Af with the crank arm centerline Ac marking the border therebetween, and the right arm portion Ar and the left arm portion Af are asymmetric with respect to the crank arm centerline Ac.

Figure 14:
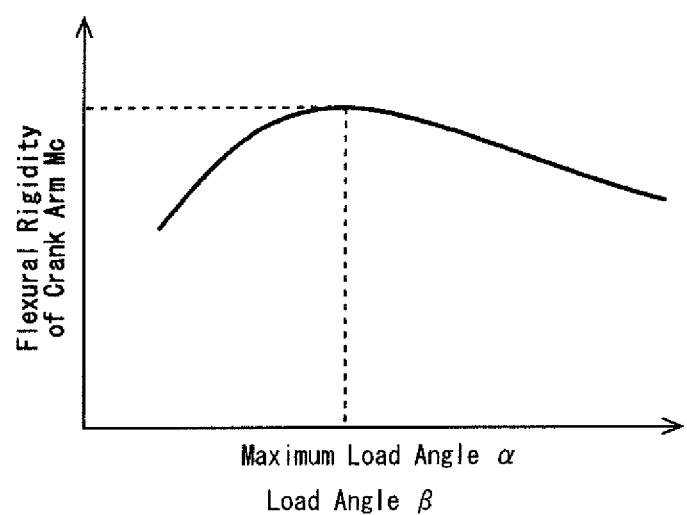
FIG. 14 is a chart showing design of the crank arm shape such that the crank arm has a maximum flexural rigidity at the point of time when the load of combustion pressure reaches a maximum.

Configuring the crank arm A to be laterally asymmetric is an efficient way to provide a lightweight crank arm A of which stiffness is increased sufficiently to resist against the maximum bending load applied to the crank arm A at the maximum load angle α. Various asymmetric shapes are possible as the shape of the crank arm A. For example, designing the crank arm A, with the load angle β used as a parameter and varied, to have a maximum flexural rigidity at the point of time when the load angle β becomes the maximum load angle α (that is, at the point of time when the load due to the combustion pressure reaches a maximum) as shown in FIG. 14 is the most efficient way to obtain a lightweight crank arm A with no excess volume. Thereby, the crank arm A is the most lightweight and high in stiffness, and the crankshaft can deliver the best possible performance.

In this regard, as shown in FIG. 13(b), on a cross section at a position outward of the axis of the crank pin, the area moment of inertia of the left arm portion Af that is in the side that is subjected to the maximum load is greater than the area moment of inertia of the right arm portion Ar that is in the side opposite to the side that is subjected to the maximum load. Also, as shown in FIG. 13(c), on a cross section at a position inward of the axis of the crank pin, the area moment of inertia of the right arm portion Ar that is in the side opposite to the side that is subjected to the maximum load is greater than the area moment of inertia of the left arm portion Af that is in the side that is subjected to the maximum load.

2-3-2. Minimization of Weight as Object Function

As described above, designing a crank arm to have a minimum weight under the condition that the flexural rigidity of the crank arm at the point of time when a bending load is applied thereto at the maximum load angle α is fixed is equivalent to designing the crank arm to have a maximum flexural rigidity at the point of time when a bending load is applied thereto at the maximum load angle α. In short, minimizing the weight as an object function is another expression of maximizing the flexural rigidity. Optimal design in either of these ways provides the same crank arm shape, which means that the requirements are the same.

Figure 15:
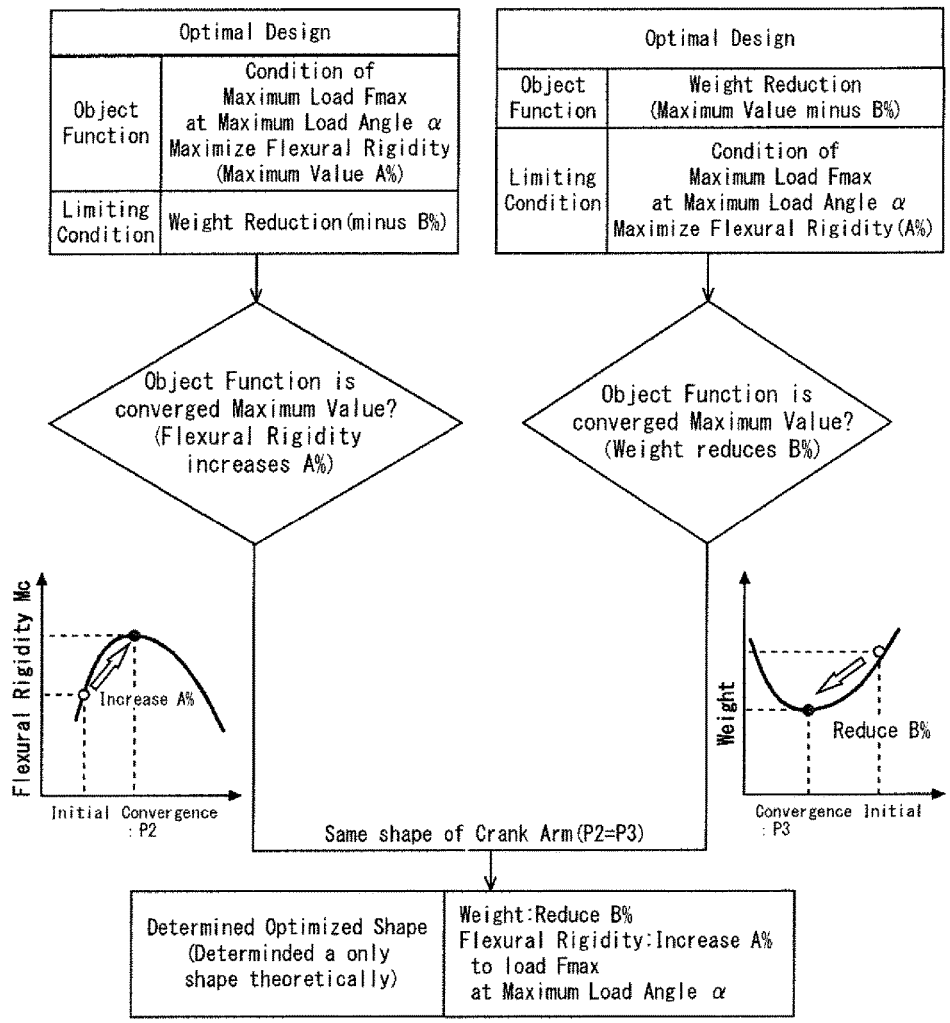
FIG. 15 is a chart showing that an objective function to minimize the weight is equivalent to an objective function to maximize the flexural rigidity in the crank arm design outline shown in FIG. 11.

FIG. 15 is a chart indicating that in the outline of design of a crank arm shown in FIG. 11, setting minimization of weight as the object function is equivalent to setting maximization of flexural rigidity as the object function. FIG. 15 shows two approaches to optimal design of a crank arm: an approach where an increase in stiffness is set as the limiting condition, and a reduction in weight is set as the object function (right side in FIG. 15), and an approach where these are interchanged, that is, a reduction in weight is set as the limiting condition, and an increase in stiffness is set as the object function (left side in FIG. 15). These approaches to optimal design provide the same shape as the filially converged and designed shape though different processes. For example, either of the approaches provides, as the finally converged and designed shape, the same crank arm shape with a reduction in weight by minus 6% and an increase in stiffness by A %.

2-3-3. Examples of Crank Arm Shape

Figure 16:
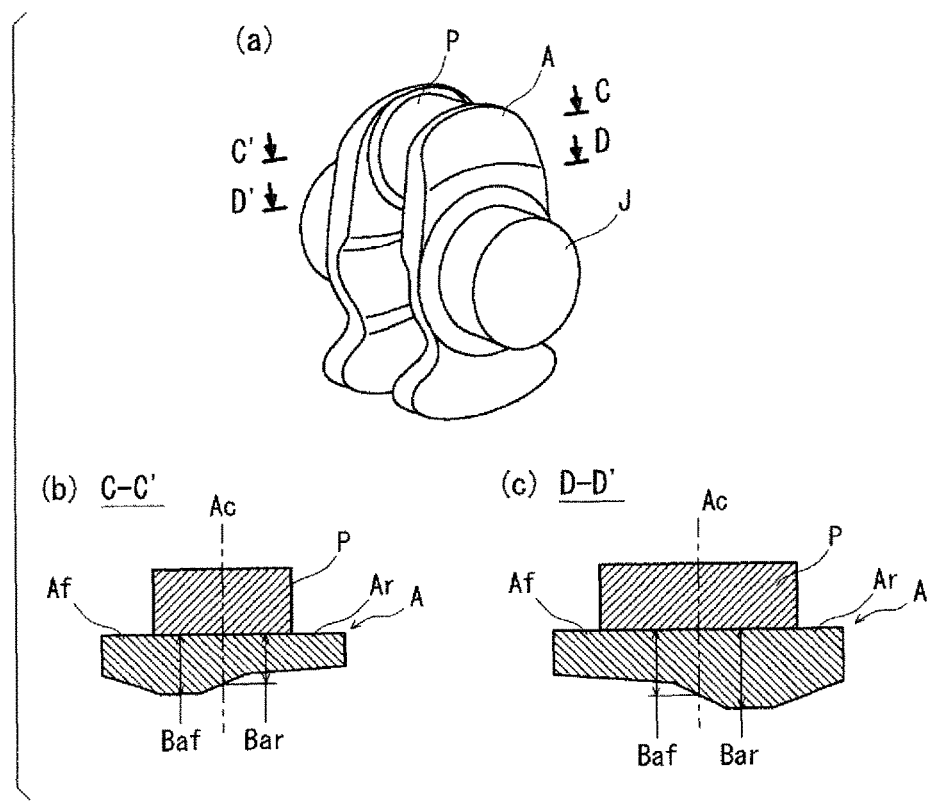
FIGS. 16(a) to 16(c) are diagrams showing an example of the shape of the crank arm of the crankshaft of the present embodiment.

FIGS. 16(a) to 16(c) are diagrams showing an example of the shape of a crank arm of a crankshaft of the present embodiment. FIGS. 17(a) to 17(c) and 18(a) to 18(c) are diagrams showing other examples thereof. Any of the figures provided with a reference symbol (a) is a perspective view of a throw, and any of the figures provided with a reference symbol (b) is a sectional view on a plane perpendicular to the crank arm centerline at a position C-C'. Further, any of the figures provided with a reference symbol (c) is a sectional view on a plane perpendicular to the crank arm centerline at a position D-D', which is different from the position C-C'. The position C-C' shown by the figures provided with the reference symbol (b) is a position that is outward of the axis of the crank pin. The position D-D' shown by the figures provided with the reference symbol (e) is a position that is inward of the axis of the crank pin.

Each of the crank arms shown by FIGS. 16(a) to 16(c), FIGS. 17(a) to 17(c) and FIGS. 18(a) to 18(c) is lightweight and high in stiffness, and has an asymmetric shape with respect to the crank arm centerline Ac. These crank arm shapes are derived along the design outline by use of a non-parametric shape optimization software as shown by FIG. 11 under the condition that a bending load is applied at the maximum load angle α. Specifically, the shape of the crank arm A is designed to be laterally asymmetric with respect to the crank arm centerline Ac such that the crank arm A has a maximum flexural rigidity at the point of time when the load on the crank pin due to the combustion pressure reaches a maximum. Thus, the crank arm A has a laterally asymmetric shape with respect to the crank arm centerline Ac. Further, as shown by the figures provided with the reference symbol (b), in a section at a position outward of the axis of the crank pin P, the area moment of inertia of the left arm portion Af that is in the side that is subjected to the maximum load is greater than the area moment of inertia of the right arm portion Ar that is in the side opposite to the side that is subjected to the maximum load. Also, as shown by the figures provided with the reference symbol (c), in a section at a position inward of the axis of the crank pin P, the area moment of inertia of the right arm portion Ar that is in the side opposite to the side that is subjected to the maximum load is greater than the area moment of inertia of the left arm portion Af that is in the side that is subjected to the maximum load.

With regard to the crank arm A shown by FIGS. 16(a) to 16(c), in a section at a position outward of the axis of the crank pin P, the maximum thickness Baf of the left arm portion Af is greater than the maximum thickness Bbr of the right arm portion Ar (see FIG. 16(b)), and in a section at a position inward of the axis of the crank pin P, the maximum thickness Baf of the left arm portion Af is smaller than the maximum thickness Bar of the right arm portion Ar (see FIG. 16(c)).

Figure 17:
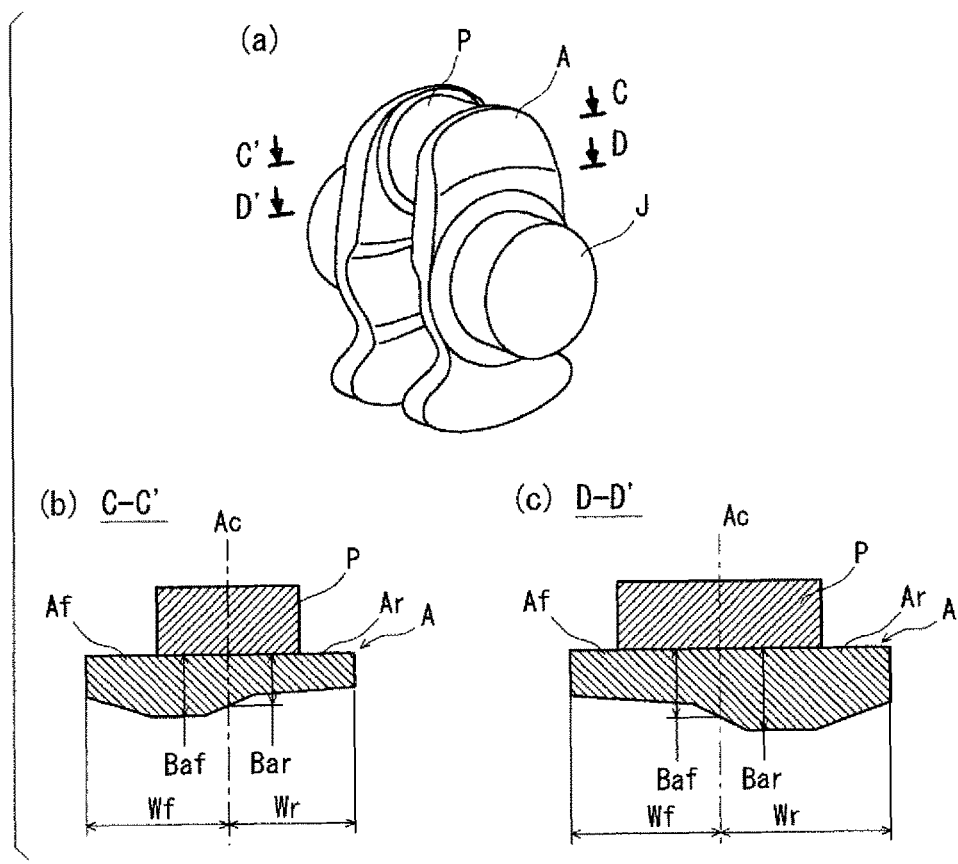
FIGS. 17(a) to 17(c) are diagrams showing another example of the shape of the crank arm of the crankshaft of the present embodiment.

The crank arm A shown by FIGS. 17(a) to 17(c) is a modification of the crank arm A shown by FIGS. 16(a) to 16(c). The difference is as follows. With regard to the crank arm A shown by FIGS. 17(a) to 17(c), in a section at a position outward of the axis of the crank pin P, the width Wf of the left arm portion Af is greater than the width Wr of the right arm portion Ar (see FIG. 16(b)), and in a section at a position inward of the axis of the crank pin P, the width Wf of the left arm portion Af is smaller than the width Wr of the right arm portion Ar (see FIG. 16(c)).

Figure 18:
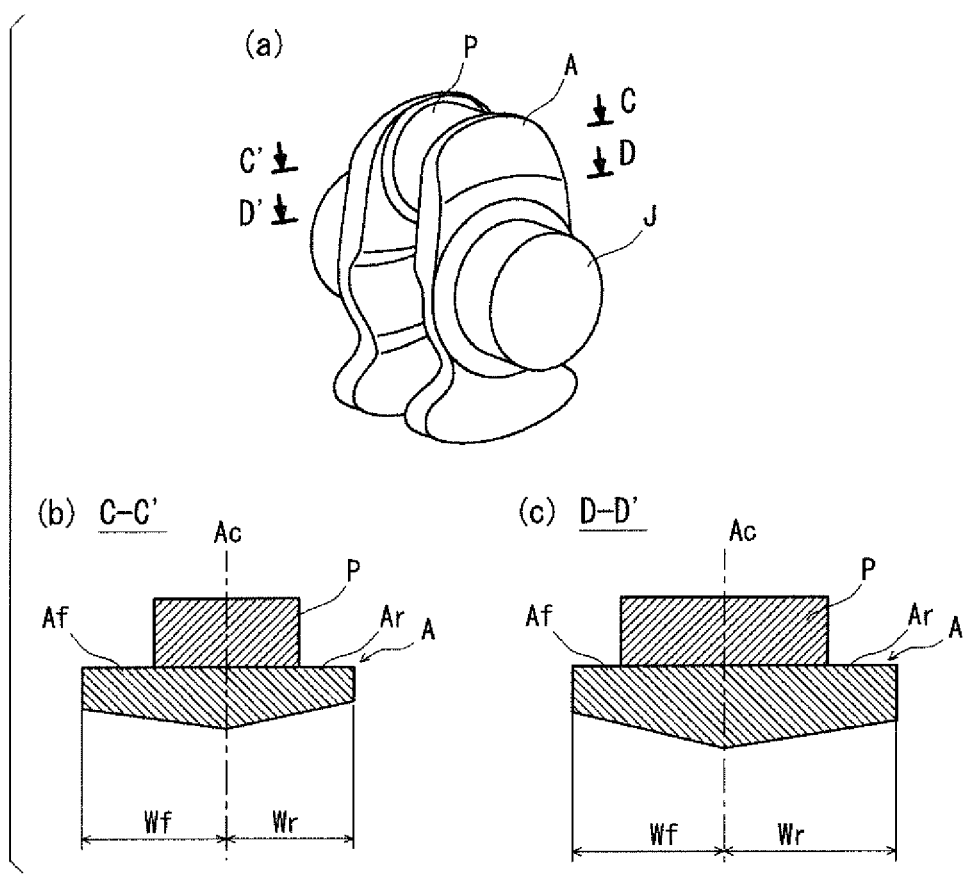
FIGS. 18(a) to 18(c) are diagrams showing another example of the shape of the crank arm of the crankshaft of the present embodiment.

The crank arm A shown by FIGS. 18(a) to 18(c) is a modification of the crank arm A shown by FIGS. 17(a) to 17(c). The difference is as follows. With regard to the crank arm A shown by FIGS. 18(a) to 18(c), the maximum thickness is laterally symmetric with respect to the crank arm centerline Ac.

The conventional crank arm A shown by FIGS. 19(a) to 19(c), however, has a laterally symmetric shape with respect to the crank arm centerline Ac.

Figure 20:
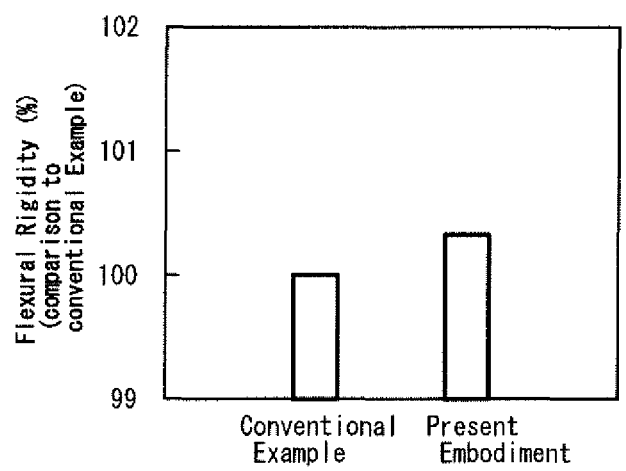
FIG. 20 is a graph showing the comparison between the flexural rigidity of the crank arm of the present embodiment shown by FIGS. 16(a) to 16(c) and the flexural rigidity of the conventional crank arm shown by FIGS. 19(a) to 19(c).
Figure 21:
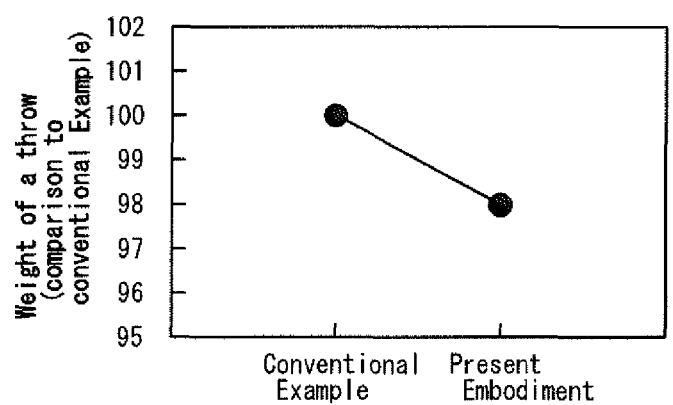
FIG. 21 is a graph showing the comparison between the weight of a throw including the crank arm of the present embodiment shown by FIGS. 16(a) to 16(c) and the weight of a throw including the conventional crank arm shown by FIGS. 19(a) to 19(c).

FIG. 20 is a graph showing the comparison between the flexural rigidity of the crank arm of the present embodiment shown by FIGS. 16(a) to 16(c) and the flexural rigidity of the conventional crank arm shown by FIGS. 19(a) to 19(c). FIG. 21 is a graph showing the comparison between the weight of a throw including the crank arm of the present embodiment shown by FIGS. 16(a) to 16(c) and the weight of a throw including the conventional crank arm shown by FIGS. 19(a) to 19(c). In each of the graphs, the comparison is shown by a proportion with the value of the conventional crank arm or throw assumed to be a reference (100%).

As is clear from FIG. 20, the flexural rigidity of the crank arm of the present embodiment is greater than that of the conventional crank arm. As is clear from FIG. 21, the weight of a throw including the crank arm of the present embodiment is smaller than that of a throw including the conventional crank arm. In conclusion, a crank arm having an asymmetric shape, like the crank arm of the present embodiment, is lightweight and high in flexural rigidity.

As thus far described, the crankshaft of the present embodiment is configured to fit for reality, and specifically, each crank arm of the crankshaft is configured to be asymmetric with respect to the crank arm centerline. Thereby, the crankshaft is improved in flexural rigidity with high reliability and at the same time, is reduced in weight. Such a crankshaft can be obtained effectually by a design method of the present embodiment.

The present invention is applicable to crankshafts to be mounted in a variety of reciprocating engines. Specifically, the engine may have any number of cylinders as well as four cylinders, for example, two cylinders, three cylinders, six cylinders, eight cylinders or ten cylinders, and even more cylinders. The cylinder arrangement may be of any type, for example, in-line type, V-type, opposed type or the like. The fuel for the engine may be of any kind, for example, gasoline, diesel, biofuel or the like. Also, the engines include a hybrid engine consisting of an internal-combustion engine and an electric motor.

INDUSTRIAL APPLICABILITY

The present invention is capable of being effectively utilized in crankshafts to be mounted in a variety of reciprocating engines.

DESCRIPTION OF REFERENCE SYMBOLS

1: crankshaft
J, J1 to J5: journal
Jc: axis of journal,
P, P1 to P4: crank pin
Pc: axis of crank pin
Fr: front part
Fl: flange
A, A1 to A8: crank arm
Ac: crank arm centerline
Ar: right arm portion
Af: left arm portion
W, W1 to W8: counterweight
2: damper pulley
3: flywheel
4: connecting rod
4S: small end
4Sc: axis of small end (axis of piston pin)

The invention claimed is:

1. A crankshaft for a reciprocating engine, the crankshaft comprising:
a first journal that defines a central axis of rotation;
a first crank pin that is eccentric with respect to the first journal;
a first crank arm connecting the first journal to the first crank pin;
a first counterweight integrated with the first crank arm;
wherein the first crank arm is divided into a right arm portion and a left arm portion by a crank arm centerline connecting an axis of the first crank pin to the central axis of rotation;
wherein the first crank arm has an asymmetric shape with respect to the crank arm centerline;
wherein the first crank arm has a maximum flexural rigidity at a point of time when a maximum load is applied to the first crank pin due to a combustion pressure; and
a first direction from the central axis of rotation to the axis of the first crank pin,
a first cross-section of the first crank arm being on a first plane perpendicular to the first direction, the first cross-section being located at a first position radially outward from the axis of the first crank pin along the first direction, the first cross-section having a first area moment of inertia of one of the right and the left arm portions that is in a side that is subjected to the maximum load and a second area moment of inertia of the other of the right and the left arm portions that is in a side opposite to the side that is subjected to the maximum load, and the first area moment of inertia being greater than the second area moment of inertia,
the first area moment of inertia having a first maximum thickness the second area moment of inertia having a second maximum thickness, the first maximum thickness being greater than the second maximum thickness;
the first and the second maximum thicknesses are parallel to the central axis of rotation;
a second direction from the axis of the first crank pin to the central axis of rotation;
a second cross-section of the first crank arm being on a second plane perpendicular to the second direction, the second cross-section being located at a second position between the axis of the first crank pin and the central axis of rotation along the second direction, the second cross-section having a third area moment of inertia of the other of the right and left arm portions that is in the side opposite to the side that is subjected to the maximum load and a fourth area moment of inertia of the one of the right and left arm portions that is in the side that is subjected to the maximum load, and the third area moment of inertia being greater than the fourth area moment of inertia,
the third area moment of inertia having a third maximum thickness the fourth area moment of inertia having a fourth maximum thickness, the third maximum thickness being greater than the fourth maximum thickness;
the third and the fourth maximum thicknesses are parallel to the central axis of rotation.

2. A crankshaft for a reciprocating engine, the crankshaft comprising:
a first journal that defines a central axis of rotation;
a first crank pin that is eccentric with respect to the first journal;
a first crank arm connecting the first journal to the first crank pin;
a first counterweight integrated with the first crank arm;
wherein the first crank arm is divided into a right arm portion and a left arm portion by a crank arm centerline connecting an axis of the first crank pin to the central axis of rotation;
wherein the first crank arm has an asymmetric shape with respect to the crank arm centerline;
wherein the first crank arm has a maximum flexural rigidity at a point of time when a maximum load is applied to the first crank pin due to a combustion pressure; and
a first direction from the central axis of rotation to the axis of the first crank pin,
a first cross-section of the first crank arm being on a first plane perpendicular to the first direction, the first cross-section being located at a first position radially outward from the axis of the first crank pin along the first direction, the first cross-section having a first area moment of inertia of one of the right and the left arm portions that is in a side that is subjected to the maximum load and a second area moment of inertia of the other of the right and the left arm portions that is in a side opposite to the side that is subjected to the maximum load,
the first area moment of inertia being greater than the second area moment of inertia,
the first area moment of inertia having a first maximum width the second area moment of inertia having a second maximum width, the first maximum width being greater than the second maximum width;

the first and the second maximum widths are perpendicular to the central axis of rotation and the first direction;
a second direction from the axis of the first crank pin to the central axis of rotation;
a second cross-section of the first crank arm being on a second plane perpendicular to the second direction, the second cross-section being located at a second position between the axis of the first crank pin and the central axis of rotation along the second direction, the second cross-section having a third area moment of inertia of the other of the right and left arm portions that is in the side opposite to the side that is subjected to the maximum load and a fourth area moment of inertia of the one of the right and left arm portions that is in the side that is subjected to the maximum load, the third area moment of inertia being greater than the fourth area moment of inertia,
the third area moment of inertia having a third maximum width the fourth area moment of inertia having a fourth maximum width, the third maximum width being greater than the fourth maximum width;
the third and the fourth maximum widths are perpendicular to the central axis of rotation and the second direction.

\* \* \* \* \*